US009100836B2

(12) United States Patent
Khan et al.

(10) Patent No.: US 9,100,836 B2
(45) Date of Patent: Aug. 4, 2015

(54) RADIO RESOURCE MANAGEMENT IN MOBILE COMMUNICATION NETWORK EMPLOYING PRIVATE BASE STATIONS

(75) Inventors: Mohammad Enam Ur Rahman Khan, Dhaka (BD); Matti Latva-Aho, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 331 days.

(21) Appl. No.: 13/257,415

(22) PCT Filed: Mar. 20, 2009

(86) PCT No.: PCT/EP2009/053287
§ 371 (c)(1),
(2), (4) Date: Dec. 12, 2011

(87) PCT Pub. No.: WO2010/105690
PCT Pub. Date: Sep. 23, 2010

(65) Prior Publication Data
US 2012/0077508 A1   Mar. 29, 2012

(51) Int. Cl.
*H04Q 7/20* (2006.01)
*H04W 16/16* (2009.01)
*H04W 36/20* (2009.01)
*H04W 72/04* (2009.01)
*H04W 84/04* (2009.01)

(52) U.S. Cl.
CPC .............. *H04W 16/16* (2013.01); *H04W 36/20* (2013.01); *H04W 72/042* (2013.01); *H04W 84/045* (2013.01)

(58) Field of Classification Search
None
See application file for complete search history.

(56) References Cited

U.S. PATENT DOCUMENTS

| 6,208,869 B1 * | 3/2001 | Roberts et al. ................. 455/465 |
| 2008/0159208 A1 | 7/2008 | Kloker et al. |
| 2009/0238130 A1 * | 9/2009 | Nakatsugawa ................. 370/329 |
| 2010/0029282 A1 * | 2/2010 | Stamoulis et al. ............. 455/436 |

FOREIGN PATENT DOCUMENTS

| EP | 0802692 A2 | 10/1997 |
| WO | WO 98/39939 A2 | 9/1998 |
| WO | WO 2007/122297 A1 | 11/2007 |

* cited by examiner

*Primary Examiner* — Charles Appiah
*Assistant Examiner* — Randy Peaches
(74) *Attorney, Agent, or Firm* — Harrington & Smith

(57) ABSTRACT

There is provided a solution for reusing radio resources opportunistically by private base stations to increase the overall capacity of the network. The solution is based on applying an uplink broadcast in a mobile communication, in which information representing a radio resource allocated by a base station to a user terminal is broadcasted.

24 Claims, 3 Drawing Sheets

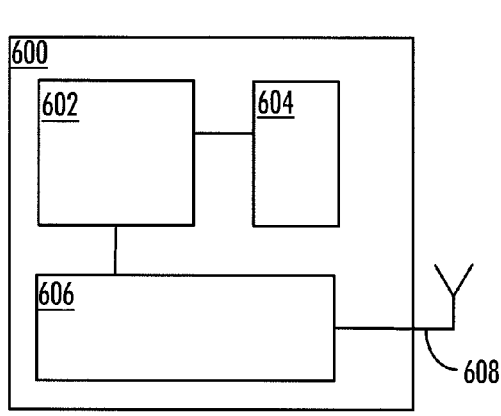
FIG. 5
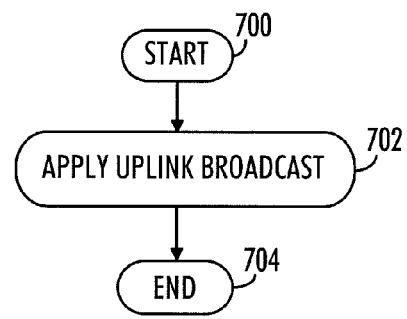
FIG. 6
FIG. 7
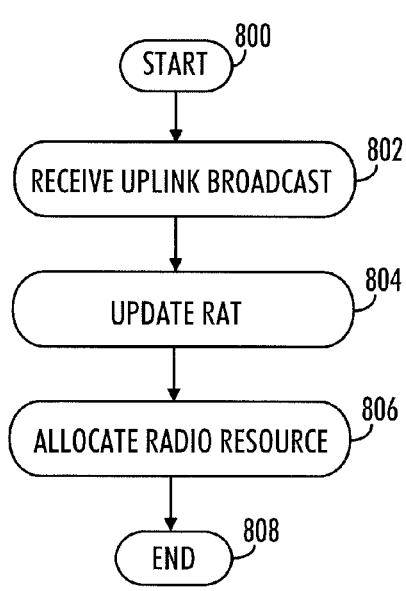
FIG. 8
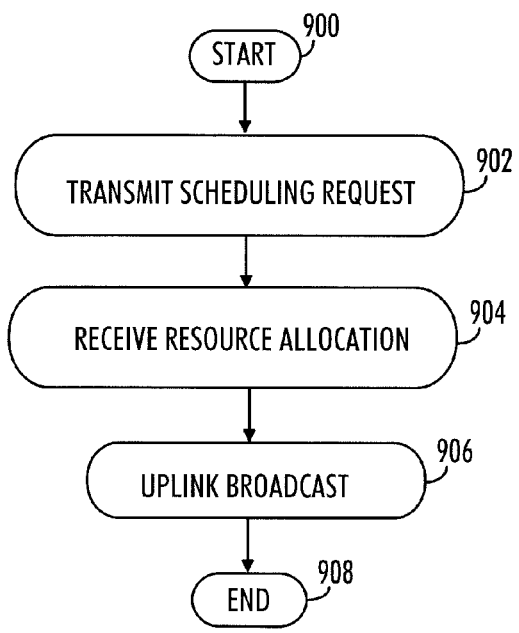
FIG. 9

RADIO RESOURCE MANAGEMENT IN MOBILE COMMUNICATION NETWORK EMPLOYING PRIVATE BASE STATIONS

FIELD

The invention relates generally to mobile communication networks. More particularly, the invention relates to radio resource management in a mobile communication network employing private base stations.

BACKGROUND

In radio communication networks, such as the Long Term Evolution (LTE) or the LTE-Advanced (LTE-A) of the 3rd Generation Partnership Project (3GPP), network planning comprises the use of public base stations (a node B (NB) or an evolved node B (eNB)) accessible by all subscribers within the cell covered by the base station. However, it is not rare that certain environments are left without sufficient coverage or capacity even though being located within the coverage area of the cell. These environments may include, for example, homes or offices.

As a solution to provide sufficient coverage and capacity to these types of areas, a femtocell radio coverage area is provided. A femtocell is generated by establishing a private base station (a home node B (hNB)) in the area. The hNB provides coverage to a small area within the coverage area of the eNB. That is, a femtocell radio coverage area allows service providers to extend service coverage to areas where coverage would otherwise be limited or unavailable. Therefore, a user terminal can benefit from an increased capacity by connecting to the hNB and communicating with it, instead of the eNB.

However, several challenges are related to a private base station co-existing within a larger cell, such as a macrocell or a microcell. These include, for example, spectrum allocation (radio resource management) between the users of the private base station and the users of the public base station. Thus, it is important to provide a solution for optimizing the radio resource management in a mobile communication network employing private base stations co-existing with a public base station.

BRIEF DESCRIPTION OF EMBODIMENTS

An object of the invention is to provide an improved radio resource management solution for a communication network employing femtocells.

LIST OF DRAWINGS

In the following, the invention will be described in greater detail with reference to the embodiments and the accompanying drawings, in which FIG. 1A presents a communication network employing private base stations, according to an embodiment;

FIG. 1B presents a communication network employing a private base station, according to an embodiment;

FIG. 5 illustrates a communication uplink signal according to an embodiment;

FIG. 6 shows a block diagram of an apparatus according to an embodiment;

FIG. 7 illustrates a method for applying uplink broadcast according to an embodiment;

FIG. 8 presents a method for allocating a radio resource, according to an embodiment; and FIG. 9 presents a method for transmitting the uplink broadcast according to an embodiment.

DESCRIPTION OF EMBODIMENTS

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments. Although this invention is described using LTE (or Evolved universal mobile telecommunications system (UMTS) terrestrial radio access network (UTRAN)) as a basis, it can be applicable to any other wireless mobile communication systems as well. For example, the embodiments may be applied under the UMTS or the Global system for mobile communications (GSM), etc. The telecommunication system may have a fixed infrastructure providing wireless services to subscriber terminals. Further, the solution described herein may be used for both an uplink and a downlink radio resource management.

Figure 1A:
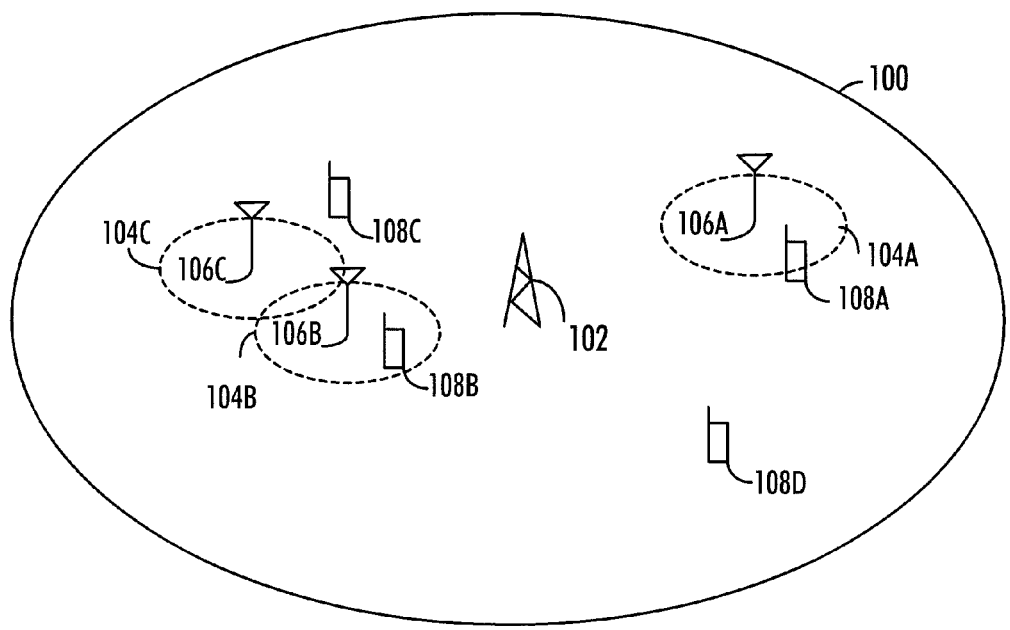

FIG. 1A shows a communication network employing private base stations, according to an embodiment. The communication network may comprise a public base station 102. The public base station 102 may provide radio coverage to a cell 100, control radio resource allocation, perform data and control signaling, etc. The cell 100 may be a macrocell, a microcell, or any other type of cell where radio coverage is present. Further, the cell 100 may be of any size or form depending on the antenna aperture. That is, it may not be of oval or circular form, but any other form is applicable to embodiments as well.

The public base station may be used by multiple network operators in order to provide radio coverage from multiple operators to the cell 100. The public base station 102 may be also called an open access base station. The public base station 102 may be a node B, an evolved node B (eNB) as in LTE-A, a radio network controller (RNC), or any other apparatus capable of controlling a radio communication within the cell 100. However, for the sake of simplicity of the description, let us assume that the public base station is an eNB. In the case of multiple eNBs in the communication network, the eNBs may be connected to each other with an X2 interface and via an S1 interface to an evolved packet core (EPC), more specifically to a mobility management entity (MME) and to a serving gateway (S-GW). The MME controls the functions of non-access stratum signaling, roaming, authentication, tracking area list management, etc., whereas the S-GW handles functions including packet routing and forwarding, E-UTRAN idle mode packet buffering, etc.

According to an embodiment, there are one or more femtocell radio coverage areas 104A to 104C within the cell 100. The one or more femtocell radio coverage areas 104A to 104C may be covered with radio access by corresponding one or more private base stations 106A to 106C, also known as home node Bs (hNB), private access points, closed access base stations, or the like. That is, the one or more hNBs 106A to 106C provide radio coverage to the one or more femtocell radio coverage areas 104A to 104C. The hNB 106A to 106C (or the private base station) may be any apparatus capable of providing coverage and controlling radio communication within the cell 104A to 104C. However, the hNB 106A to 106C differs from the eNB 102 such that the hNB 106A to 106C may be installed by a private user. Typically, the hNB 106A to 106C provides radio coverage to a smaller cell area than the eNB 102.

The hNBs 106A to 106C may be set up, for example, by an end user of a mobile communication network, such as a subscriber of a network provider. The hNBs 106A to 106C can be, for example, in an active state, a sleep mode, a transition state, they may be switched off, or the like. The hNBs 106A to 106C may be switched off by anyone who has access to the hNBs 106A to 106C, for example the private users that have set up the hNBs 106A to 106C. Even though the end user may manually switch the hNB 106A to 106C on, the hNB 106A to 106C may automatically configure itself without any kind of manual intervention. Further, the hNBs 106A to 106C are independent of each other such that if, for example, the hNB 106A is in an active state, the hNB 106C may be switched off.

The eNB 102 and the hNBs 106A to 106C may be connected to and controlled by the EPC (MME, S-GW) of the network provider even though not shown in FIG. 1. That is, the eNB 102 may be part of the network planning of the operator, whereas the HNBs 106A to 106C may be deployed without any network planning. The connection between the hNB 106A to 106C and the EPC may be accomplished via the S1 interface. The connection from the hNB 106A to 106C to the EPC may be direct or it may contain a HNG gateway between the hNB 106A to 106C and the EPC. The hNB 106A to 106C may be moved from one geographical area to another and therefore it may need to connect to a different hNB gateway depending on its location. Further, the hNBs 106A to 106C may connect to a service provider's network via a broadband (such as DSL), etc.

According to an embodiment, either the eNB 102 or the hNB 106A to 106C may establish a connection with a user terminal (UT) 108A to 108D such as a mobile user terminal, a palm computer, user equipment or any other apparatus capable of operating in a mobile communication network. That is, the UT 108A to 108D may perform data communication with the eNB 102 or one of the hNBs 106A to 106C. If the UT 108A to 108D is located in a femtocell radio coverage area 104A to 104C, it may be connected to the corresponding hNB 106A to 106C. If the UT 108A to 108D is located outside the femtocell radio coverage areas 104A to 104C, the UT 108A-108D may be connected to the eNB 102. However, the UT 108A to 108D may also be in a sleep mode or idle mode, that is, it may not be connected to any base station. The term "base station" throughout the application denotes either the public base station 102 or a private base station 106A to 106C.

Figure 1B:
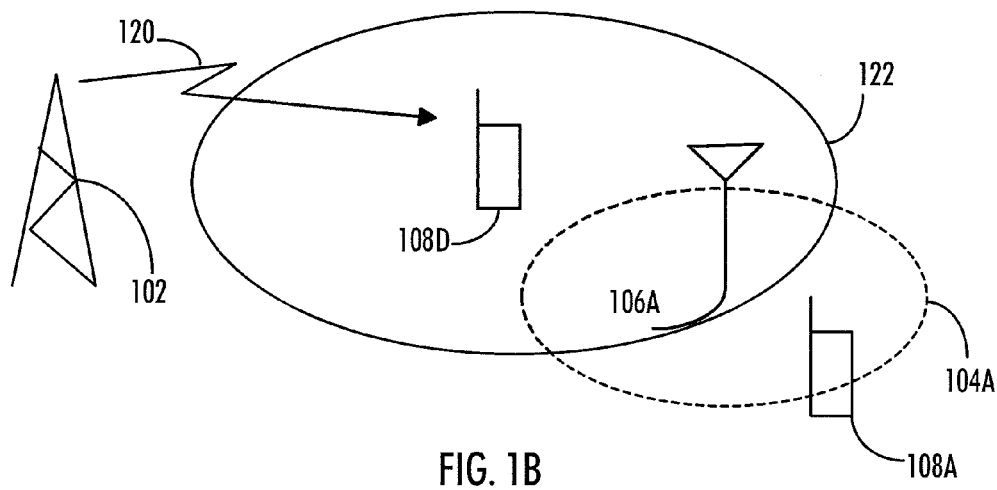

Let us assume that the user terminal 108A is located within the femtocell radio coverage area 104A covered with radio access by the hNB 106A, as shown in FIG. 1B. Let us further assume that the UT 108D is located outside the femtocell radio coverage area 104A but within the cell covered with radio access by the eNB 102. According to an embodiment shown in FIG. 1B, the eNB 102 may allocate a radio resource via a physical downlink control channel (PDCCH) 120 to the UT 108D. Prior to allocating a radio resource to the UT 108D, the UT 108D may have had requested a radio resource from the eNB 108D via a physical uplink control channel (PUCCH). Alternatively, the UT 108D may have requested a radio resource from the eNB 108D via a random access channel (RACH).

Figure 2:
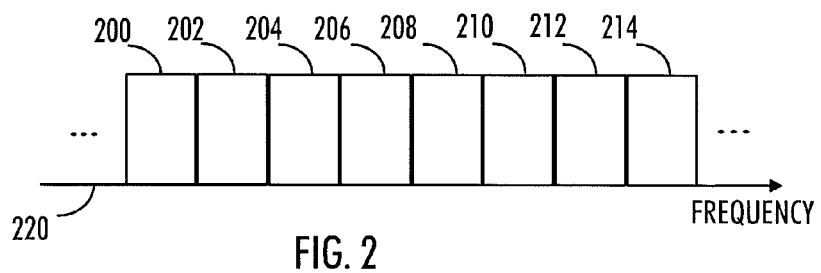
FIG. 2 shows a pool of radio resources in a frequency domain, according to an embodiment.

The radio resource may be allocated in a frequency domain as shown in FIG. 2. The X axis 220 represents a frequency range, wherein low frequencies are on the left side and the high frequencies on the right side of FIG. 2. According to an embodiment, the frequencies are divided into a plurality of physical resource blocks 200-214, each with its own frequency range. For example, in orthogonal frequency division multiplexing (OFDM), users are allocated a specific number of subcarriers for a predetermined amount of time. A certain number of subcarriers are defined as the physical resource block (RB) in the LTE specification. In an embodiment, the RB consists of 12 subcarriers for a time slot of 1 ms. That is, the RBs 200-214 have both a time dimension and a frequency dimension. The total number of subcarriers, and thus the total number of RBs, depend on the available bandwidth of the communication system, for example the spectrum of any specific operator. Even though only a frequency-based RB 200-214 division is shown here, a similar approach could be taken with a time domain based RB division.

Figure 3A:
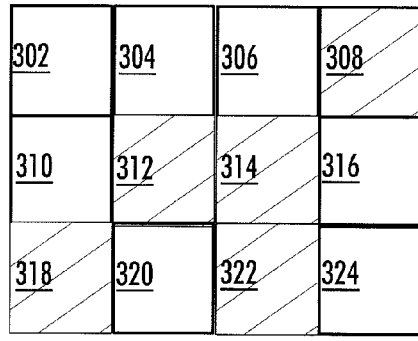
FIG. 3A shows a radio resource allocation table according to an embodiment.

FIG. 3A presents a radio resource allocation table (RAT) 300 according to an embodiment. The RAT 300 comprises information regarding availability of radio resource blocks 302-324. For example, the RBs 308, 312, 314, 318 and 322 of the RAT 300 marked with right-leaning diagonal lines are RBs already allocated by base stations to UTs whose uplink broadcast can be detected by the private base station updating the corresponding RAT 300. That is, each hNB has its own RAT 300, which they update and populate by listening to the uplink broadcast of the UTs. Further, the RAT 300 of each private base station is also updated according to the allocated resource blocks by the corresponding private base station. As an example, the RBs 302-306, 310, 316, 320 and 324 are available for allocation in the RAT 300 at any transmission time interval (TTI).

The radio resource allocation may be performed at every TTI. That is, one resource allocation may be valid for the time duration of the TTI, and after the TTI has elapsed, the base station may allocate the same or a different radio resource block to the user terminal. The TTI equals 1 ms in the LTE. However, if the communication between the base station and the user terminal is finished, the base station may not need to allocate any resource to the user terminal.

Let us again take a look at FIG. 1B. The allocation of a radio resource may take place in the scheduling function of the eNB 102. After receiving the allocated RB from the eNB 102 via the PDCCH 120, the UT 108D may perform data communication with the eNB 102 by transmitting and/or receiving data on the allocated RB.

Further, after receiving the allocated RB from the eNB 102, the UT 108D may apply the uplink broadcast in mobile communication, in which information representing a radio resource allocated by a base station to the user terminal 108D is broadcasted. The base station may be either the public base station 102 or a private base station 106A. In the embodiment shown in FIG. 1B it is the public base station (eNB) 102. The user terminal 108D may broadcast the information on an uplink broadcast channel (UBCH).

As shown in FIG. 1B, after receiving the allocated radio resource block via the PDCCH 120, the UT 108D may, according to an embodiment, broadcast the information regarding the allocated radio resource to a predetermined area 122 around the UT 108D such that only one or more private base stations located within the area 122 are able to receive/detect the broadcast. That is, even if an eNB would be in the area 122 of the broadcast, the eNB would not receive the broadcast. For example, the eNB can be configured such that it does not receive the broadcast from a user terminal. The eNB can also be configured such that it ignores the broadcast from a user terminal. Because the eNB does not need the broadcast information, it may not listen to the broadcast.

On the contrary, the one or more private base stations 106A located within the area 122 are able to receive the broadcast. For example, the hNB 106A may be configured such that it receives/detects the broadcast from a user terminal. Further, the hNB 106A may be configured such that it acknowledges the broadcast. Further, the hNB 106A may be configured such that it always listens to the UBCH. That is, it may be configured such that it always listens to a broadcast containing the radio resource allocation information of any user terminal.

According to an embodiment, the UT will apply the uplink broadcast regardless which base station allocated the radio resource to the UT. In other words, the radio resource may be allocated to the user terminal by any base station, either a private base station or a public base station, but the UT would still broadcast the uplink broadcast. Moreover, the broadcast is receivable by only the hNBs within the broadcast area, not by the eNBs. That is, only the hNBs within the broadcast area can understand the broadcast, not the eNBs.

According to another embodiment, the UT will apply the uplink broadcast only when it receives a radio resource allocation from an eNB. That is, if the UT received a radio resource allocation from an hNB, the UT would not broadcast the uplink broadcast. The broadcast is receivable by only the hNBs within the broadcast area, not by the eNBs. That is, only the hNBs within the broadcast area can understand the broadcast, not the eNBs.

According to an embodiment, the predetermined area 122, in which the broadcast is broadcasted by the UT 108D, is smaller than the radio coverage area of a public base station 102 in whose radio coverage area the one or more private base stations 106A are located. That is, the area 122 may be smaller than the cell 100 in FIG. 1A. In other words, the UT 108D may not broadcast the message to cover the whole cell 100, but only to a limited area 122. That is, the broadcast may not extend beyond the radio coverage area of the public base station 102.

Further, according to an embodiment, the predetermined area 122 is larger than the radio coverage area 104A of any of the one or more private base stations 106A located within the radio coverage of the public base station 102. In other words, the area 122 in which the UT 108D broadcasts the information regarding the allocated RB is larger than the femtocell radio coverage area 104A. This way, the hNB 106A may receive the broadcast from the UT 108D. Thus, even if the UT 108D moved inside the femtocell radio coverage area 104A during communication with the eNB 102, the hNB 106A would know which radio resource block it is applying in its communication with the eNB 102. Also, since the UT 108D receiving the resource allocation from the eNB 102 is located relatively close to the edge of the radio coverage area 104A, the communication between the hNB 106A and the UT 108A might interfere with the communication between the eNB 102 and the UT 108D if the communication between the hNB 106A and the UT 108A applied the same radio resource as the communication between the eNB 102 and the UT 108D. By having the predetermined area 122 larger than the radio coverage area 104A, the hNB 106A may obtain knowledge about occupied radio resources and it may be able to avoid interference with the communication between the eNB 102 and the UT 108D.

Further, referring to FIG. 1A, if the UT 108B were to receive an allocated radio resource from the eNB 102, the uplink broadcast information broadcasted by the UT 108B might reach the hNB 106C in addition to 106B, even though the UT 108B is located within the femtocell radio coverage area 104B but not within the femtocell radio coverage area 104C.

The broadcast area 122 may be controlled by the user terminal by varying the transmit power of the uplink broadcast. Further, the receiving properties, such as the response to the received signal, of the receiving hNB and the condition of the radio communication channel affect the size of the operational broadcast area 122.

Figure 4:
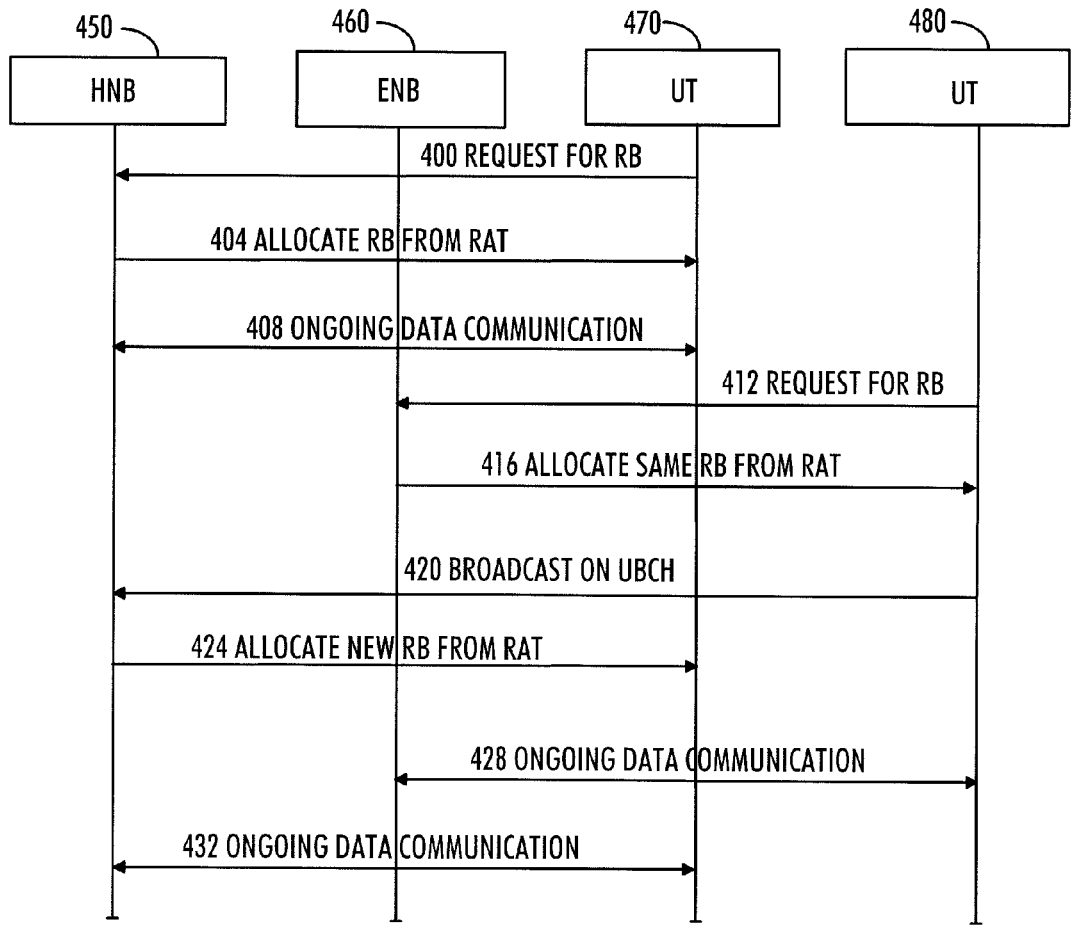
FIG. 4 illustrates a radio resource management algorithm according to an embodiment.

FIG. 4 illustrates a signaling flow diagram related to a radio resource management according to an embodiment. In step 400, a UT 470 requests a radio resource block (RB) from a hNB 450. The UT may request the RB from a private base station at least one of the following time instants: at the beginning of a setup of communication with the private base station and at predetermined intervals during ongoing communication with a base station. In this case, as an example, the UT 470 is requesting an RB at the beginning of the desired data communication with the hNB 450. The UT 470 may request the radio resource by using a packet access channel (PACH) or the PUCCH. The PACH is a channel used at the user terminal to transmit signaling messages and medium access control (MAC) messages.

In step 404, the hNB 450 tries to allocate an RB to the UT 470 from the available (unallocated) radio resources in its RAT (shown in FIG. 3A). The RAT maintains information about currently allocated and unallocated (available) radio resources. If there are no unallocated radio resources in the RAT, the hNB 450 may not be able to allocate any RB to the UT 470. However, let us assume for the sake of description that a resource block number 320 in the RAT of FIG. 3A is available for allocation. That is, in step 404, the hNB 450 allocates the RB 320 to the UT 470. The hNB 450 may apply typical algorithms for finding the best possible RB from the available RBs for allocation, such as the best link state—algorithm.

According to an embodiment, the radio resource allocated to a UT by a base station, either a private or a public base station, is allocated to the UT for a predetermined period of time. The predetermined period of time may be, for example, one transmission time interval (TTI). In the LTE, the TTI is 1 ms. Further, the base station, either a private or public base station, may release the allocated radio resource from the radio resource allocation table after a predetermined period of time. That is, even without receiving any external information, the base station is able to release the allocated RB from the RAT after a predetermined period of time. After the allocation, a data communication between the hNB 450 and the UT 470 may take place in step 408.

In step 412, a UT 480 desires to perform data communication with an eNB 460. The UT 480 initiates the communication by requesting for a resource block which could be used in the communication. This may be accomplished by transmitting a scheduling request to the eNB 460. For example, after determining that the resource block 320 would produce the best possible quality of communication with the UT 480 (by using typical algorithms for finding the best possible RB, such as the best link state—algorithm), the eNB 460 allocates the RB 320 to the UT 480 in step 416. The allocated RB 320 may be applied either in a downlink data communication or in an uplink data communication between the eNB 460 and the UT 480. The eNB 460 may not have any information regarding which resource blocks have been allocated by the one or more hNBs 450 in the radio coverage area of the eNB 460. That is, it may not know that the hNB 450 has already allocated the RB 320 to the UT 470.

Assuming that the UTs 470 and 480 are located relatively close to each other such that they both are within a radio coverage area covered by the hNB 450, the communication between the hNB 450 and the UT 470 might interfere with the communication between the eNB 460 and the UT 480 taking place in step 428.

Figure 3B:
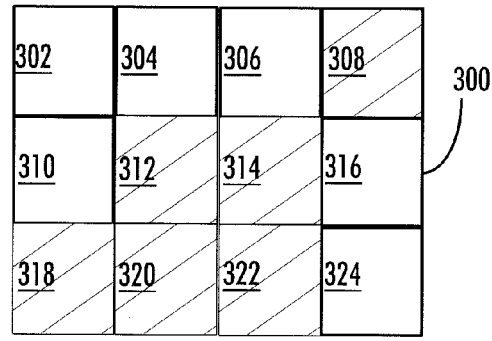
FIG. 3B shows the radio resource allocation table according to an embodiment.

According to an embodiment, the UT 480 will apply the uplink broadcast in step 420, in which information representing the allocated resource block 320 is broadcasted. As explained regarding FIG. 1B, the hNB 450 will detect the broadcast of information from the user terminal. Thus, the hNB 450 may obtain knowledge regarding which resource block has been allocated to the UT 480. After receiving the broadcast, the hNB 450 may update its RAT comprising information regarding the availability of radio resources according to the received broadcast. That is, the hNB 450 may update its RAT such that the RB 320 of FIG. 3A is marked allocated and therefore it is not available for allocation anymore. This is shown in FIG. 3B, wherein the RB 320 is marked with right-leaning diagonal lines.

According to an embodiment, after receiving/detecting the broadcast of information about the allocated RB to the UT 480, the hNB 450 updates the RAT and allocates, in step 424, a new RB to the UT 470 which already performs data communication with the hNB 450. The allocated new RB is allocated from the available, unallocated RBs in the RAT of FIG. 3B, that is the RB 320 will not be allocated but, for example, the RB 324 may be allocated. Consequently the UT 470 and the hNB 450 may continue performing data communication in step 432 by using the new RB 324. The allocated RB 324 may be applied either in a downlink data communication or in an uplink data communication between the hNB 450 and the UT 470. This way, the communication performed between the hNB 450 and the UT 470 may not interfere with the communication between the eNB 460 and the UT 480.

FIG. 5 shows a communication uplink broadcast signal 500 according to an embodiment. A user terminal may transmit the broadcast signal 500 autonomously without receiving information from a base station. Here, the eNB that has allocated a radio resource to a UT does not care whether the UT broadcasts the uplink broadcast or not. That is, the eNB does not control or influence the broadcast of the uplink broadcast from the UT. Further, the UT does not need information about surrounding hNBs while broadcasting the uplink broadcast. More specifically, the UT may not know whether there are any hNBs in the broadcast area or not.

The communication uplink broadcast signal 500 shown in FIG. 5 may comprise a message 504 representing a radio resource allocated by the base station, either a private or public base station, to the user terminal. Further, the communication uplink broadcast signal 500 may comprise header information 502 indicating a source address of a user terminal transmitting the communication uplink broadcast signal.

A very general architecture of an apparatus according to an embodiment of the invention is shown in FIG. 6. FIG. 6 only shows the elements and functional entities required for understanding the apparatus according to an embodiment of the invention. Other components have been omitted for reasons of simplicity. The implementation of the elements and functional entities may vary from those shown in FIG. 6. The connections shown in FIG. 6 are logical connections, and the actual physical connections may be different. It is apparent to a person skilled in the art that the apparatus may also comprise other functions and structures.

According to an embodiment, the apparatus 600 comprises a processor 602. The processor 602 may be implemented with a separate digital signal processor provided with suitable software embedded on a computer readable medium, or with a separate logic circuit, such as an application-specific integrated circuit (ASIC). The processor 602 may comprise an interface such as a computer port for providing communication capabilities. According to an embodiment, a user terminal, configurable to operate in a mobile communication network, comprises the apparatus 600. According to an embodiment, a private base station, configurable to operate in a mobile communication network, comprises the apparatus 600.

The processor 602 may apply the uplink broadcast in mobile communication, in which information representing a radio resource allocated by a base station to a user terminal is broadcasted. According to an embodiment, the base station is a private base station. According to an embodiment, the base station is a public base station.

According to an embodiment, the processor 602 is applicable to a user terminal and configured to control the user terminal to broadcast the information to a predetermined area around the user terminal such that only one or more private base stations located within the area are able to receive the broadcast. Term "receive" in the application denotes that the one or more private base stations are able to detect and understand the contents of the broadcast.

Further, the processor 602 may request a radio resource from a private base station at least one of the following time instants: at the beginning of a setup of communication with the private base station and at predetermined intervals during ongoing communication with a base station. In case when the processor 602 requests the radio resource at the beginning of the setup of the communication and the private base station is unable to allocate a radio resource (for example, all radio resources were already allocated) to the processor 602, the processor 602 may request a radio resource from the public base station. In case when the processor 602 requests the radio resource from a private base station during ongoing communication with a base station (either a public base station or a private base station) and the private base station is unable to allocate a radio resource (for example, all radio resources were already allocated) to the processor 602, the processor 602 may continue the communication with the base station the processor 602 is already communicating with. However, the processor 602 may begin the data communication with a private base station when the private base station has allocated a radio resource to the user terminal.

Further, according to an embodiment, the processor 602 may be restrained from requesting a radio resource from the public base station if the private base station is unable to allocate an available radio resource. This may happen during an ongoing communication with the private base station, during which the private base station is unable to allocate a new radio resource to the user terminal. According to an embodiment, the private base station may try to allocate a radio resource to the user terminal without any request. According to an embodiment, the private base station may try to allocate a radio resource to the user terminal after a request from the processor 602 applicable to the user terminal.

According to another embodiment, the processor 602 may request a radio resource from the public base station if the private base station is unable to allocate an available radio resource. This may happen during an ongoing communication with the private base station, during which the private base station is unable to allocate a new radio resource to the user terminal. The private base station may try to allocate a radio resource to the user terminal without any request or after a request from the processor 602 applicable to the user terminal.

According to an embodiment, the processor 602 is applicable to a private base station and configured to receive the broadcast of information from a user terminal. The processor 602 may further update a radio resource allocation table according to the received broadcast. According to an embodiment, the apparatus may further comprise a memory 604 connected to the processor 602. The memory 604 may be used to, for example, store the radio resource allocation table. However, the memory may also be integrated into the processor 602 and, thus, the memory 604 may not be required. That is, the RAT may also be stored in the processor 602.

The processor 602, applicable to a private base station, may also allocate available radio resources to the one or more user terminals if there are unallocated radio resources in the radio resource allocation table. The radio resource may be allocated to a user terminal for a predetermined period of time. After this period of time, the processor 602 may allocate a new RB from the unallocated RBs in the RAT if the data communication is not finished. The processor 602 may also release the allocated radio resource from the radio resource allocation table after a predetermined period of time. In other words, after a predefined period of time, the processor 602 may release the previously allocated RB 320 of FIG. 3B such that it is again available for allocation, as shown in FIG. 3A. The processor 602 may not need any external information in doing so.

The apparatus 600 may further comprise a transceiver (TRX) 606. The TRX 606 may further be connected to an antenna 608 enabling connection to and from an air interface. Alternatively, the antenna 608 may be connected to a wired interface. The TRX 606 may enable transmission and/or reception of information. For example, when the apparatus 600 is comprised in a user terminal, the TRX 606 may transmit the communication uplink broadcast signal and/or uplink data to a base station and receive radio resource allocation signaling and/or downlink data from a base station, whereby the base station is either a private or a public base station. Alternatively, when the apparatus 600 is comprised in a private base station, the TRX 606 may receive the communication uplink broadcast signal and/or uplink data from a user terminal, and transmit radio resource allocation signaling and/or downlink data to a user terminal.

FIG. 7 shows a method for applying an uplink broadcast, according to an embodiment. The method begins in step 700. In step 702 the method comprises applying an uplink broadcast in mobile communication, in which information representing a radio resource allocated by a base station to a user terminal is broadcasted. The base station is either a private base station or a public base station. The method ends in step 704.

FIG. 8 shows a method for allocating a radio resource, according to an embodiment. The method starts in step 800. In step 802 the method comprises receiving an uplink broadcast at a private base station from a user terminal, which has been allocated a radio resource, such as a physical radio resource block. The method continues in step 804 by updating a radio resource allocation table according to the received broadcast. In step 806 the method comprises allocating a radio resource to one or more user terminals. The allocation may take place, for example, at, at least one of the following time instants: at a setup of communication with the one or more user terminals and during ongoing communication with the one or more user terminals. The user terminal may be located within the femtocell radio coverage area in which radio coverage is provided by the private base station. The method ends in step 808.

FIG. 9 shows a method for transmitting an uplink broadcast. The method begins in step 900. In step 902 the method comprises transmitting a scheduling request to a base station, in which the user terminal requests for a radio resource. The base station may then allocate a radio resource to the user terminal. Consequently, the user terminal receives the allocated radio resource from the base station in step 904. In step 906 the method comprises transmitting an uplink broadcast, in which information representing a radio resource allocated by the base station to the user terminal is broadcasted. The broadcast may be received by only the one or more private base stations. The method ends in step 908.

Let us assume that the eNB and the hNB apply frequency reuse 1, in which all radio resources are available for allocation by every eNB and hNB. Since both the eNB and the hNB share the same radio resources, it may happen that they allocate the same RBs for communication with different UTs. This may lead to an interrupted communication between the UT and the eNB, or between the UT and the hNB. That is, it may lead to co-channel interference, in which the communication between the UT and the hNB interferes with the communication between the eNB and the UT. According to an embodiment, the interference caused by a private base station to the communication between the public base station and the user terminal can be avoided by applying the uplink broadcast. The broadcasted information represents an allocated radio resource to the user terminal and by receiving the broadcast the private base station obtains knowledge of allocated radio resources in the vicinity of the private base station. Consequently, the private base station may only allocate available radio resources to user terminals requesting for a radio resource allocation in order to begin a data communication with the private base station.

The invention provides several advantages. The invention enables high-frequency reuse in a mobile communication applying private base stations in order to increase the overall capacity of the radio communication network. The radio resource allocation solution according to an embodiment ensures that the communication between a private base station and a user terminal does not interfere with a communication between a public base station and a user terminal. Moreover, no coordination between the eNB and the hNB is required in order to perform the radio resource allocation solution.

However, the private base station may not be aware, which radio resources have been allocated to user terminals that are not in the vicinity of the private base station. That is, the private base station may not obtain knowledge, via the uplink broadcast, regarding the allocated radio resources from the user terminals whose broadcast areas of the uplink broadcast do not reach the private base station. More specifically, the private base station may not obtain knowledge regarding the allocated radio resources from the user terminals whose uplink broadcast the private base station cannot listen to. However, this is not required either, since even if a radio resource was allocated to a user terminal by the private base station, it would not cause interference to a communication between a far-away user terminal, even if the far-away user occupied the same radio resource.

The techniques and methods described herein may be implemented by various means. For example, these techniques may be implemented in hardware (one or more devices), firmware (one or more devices), software (one or more modules), or combinations thereof. For a hardware implementation, the apparatus of FIG. 6 may be implemented within one or more application-specific integrated circuits (ASICs), digital signal processors (DSPs), digital signal processing devices (DSPDs), programmable logic devices (PLDs), field-programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g., procedures, functions, and so on) that perform the functions described herein. The software codes may be stored in a memory unit and executed by processors. The memory unit may be implemented within the processor or externally to the processor. In the latter case it can be communicatively coupled to the processor via various means, as is known in the art. Additionally, the components of the systems described herein may be rearranged and/or complimented by additional components in order to facilitate the achieving of the various aspects, etc., described with regard thereto, and they are not limited to the precise configurations set forth in the given figures, as will be appreciated by one skilled in the art.

Thus, according to an embodiment, the apparatus for performing the tasks of FIGS. 2, 4 and 6 to 9 comprises processing means for applying an uplink broadcast in a mobile communication, in which information representing a radio resource allocated by a base station to a user terminal is broadcasted.

Embodiments of the invention may be implemented as computer programs in the apparatus of FIG. 6 according to the embodiments of the invention. The computer programs comprise instructions for executing a computer process for improving the reliability of the communication in a mobile communication network employing private base stations. The computer program implemented in the apparatus may carry out, but is not limited to, the tasks related to FIGS. 2, 4 and 6 to 9.

The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the invention has been described above with reference to an example according to the accompanying drawings, it is clear that the invention is not restricted thereto but can be modified in several ways within the scope of the appended claims. Further, it is clear to a person skilled in the art that the described embodiments may, but are not required to, be combined with other embodiments in various ways.

The invention claimed is:

1. An apparatus, comprising:
  at least one processor; and
  at least one non-transitory memory including computer program code, where the at least one memory and the computer program code are configured, with the at least one processor, to cause the apparatus to at least:
  receive, from a first base station, an allocation of a radio resource for communication between the apparatus and the first base station; and
  transmit an uplink broadcast receivable by one or more second base stations providing cell areas at least partially within a cell area of the first base station,
  wherein the uplink broadcast carries information indicating the allocated radio resource, and
  wherein the first base station provides radio coverage to a larger cell area than any of the one or more second base stations.

2. The apparatus of claim 1, wherein the first base station is a public base station.

3. The apparatus of claim 1, wherein the at least one memory including the computer program code is configured with the at least one processor to cause the apparatus to:
  broadcast the information to a predetermined area around the apparatus such that only the one or more second base stations located within the area are able to receive the broadcast.

4. The apparatus of claim 3, wherein the predetermined area is smaller than the radio coverage area of the first base station in whose radio coverage area the one or more second base stations are located.

5. The apparatus of claim 3, wherein the predetermined area is larger than the radio coverage area of any of the one or more second base stations located within the radio coverage of the first base station.

6. The apparatus of claim 1, wherein the information broadcasted in the uplink broadcast further comprises header information indicating a source address of the apparatus.

7. A method, comprising:
  receiving, from a first base station, an allocation of a radio resource for communication between the user terminal and the first base station; and
  transmitting an uplink broadcast receivable by one or more second base stations providing cell areas at least partially within a cell area of the first base station,
  wherein the uplink broadcast carries information indicating the allocated a radio resource, and
  wherein the first base station provides radio coverage to a larger cell area than any of the one or more second base stations.

8. The method of claim 7, wherein the first base station is a public base station.

9. The method of claim 8, further comprising:
  broadcasting the information to a predetermined area around the user terminal such that only the one or more second base stations located within the area are able to receive the broadcast.

10. The method of claim 9, wherein the predetermined area is smaller than the radio coverage area of the first base station in whose radio coverage area the one or more second base stations are located.

11. The method of claim 9, wherein the predetermined area is larger than the radio coverage area of any of the one or more second base stations located within the radio coverage of the first base station.

12. The method of claim 7, wherein the information broadcasted in the uplink broadcast further comprises header information indicating a source address of a user terminal broadcasting the uplink broadcast.

13. An apparatus, comprising:
  at least one processor; and
  at least one non-transitory memory including computer program code, wherein the at least one memory and the computer program code are configured, with the at least one processor, to cause the apparatus to at least:
  receive an uplink broadcast of information from a user terminal, wherein the uplink broadcast carries information indicating a radio resource allocated by a first base station to the user terminal for communication between the user terminal and the first base station, and the first base station provides radio coverage to a larger cell area than the apparatus providing a cell area at least partially within the first base station cell area; and update a radio resource allocation table comprising information regarding the availability of radio resources according to the received broadcast.

14. The apparatus of claim 13, wherein the at least one memory including the computer program code is configured with the at least one processor to cause the apparatus to:

allocate available radio resources to the one or more user terminals if there is any unallocated radio resource in the radio resource allocation table.

15. The apparatus of claim 14, wherein the at least one memory including the computer program code is further configured with the at least one processor to cause the apparatus to allocate the radio resource to the user terminal for a predetermined period of time.

16. The apparatus of claim 14, wherein the at least one memory including the computer program code is further configured with the at least one processor to cause the apparatus to release the allocated radio resource from the radio resource allocation table after a predetermined period of time.

17. The apparatus of claim 14, wherein the radio resources applied by the first base station are entirely applicable with the one or more second base stations.

18. A method, comprising:

receiving, by a particular base station of one or more second base stations, an uplink broadcast of information from a user terminal, wherein the uplink broadcast carries information indicating a radio resource allocated by a first base station to the user terminal for communication between the user terminal and the first base station, and the first base station provides radio coverage to a larger cell area than any of the one or more second base stations providing cell areas at least partially within the first base station cell area; and update a radio resource allocation table comprising information regarding the availability of radio resources according to the received broadcast.

19. The method of claim 18, further comprising:

allocating available radio resources to the one or more user terminals if there is any unallocated radio resource in the radio resource allocation table.

20. The method of claim 19, further comprising:

allocating the radio resource to the user terminal for a predetermined period of time.

21. The method of claim 19, further comprising:

releasing the allocated radio resource from the radio resource allocation table after a predetermined period of time.

22. The method of claim 19, wherein the radio resources applied by the first base station are entirely applicable with the one or more second base stations.

23. A computer program product embodied on a non-transitory computer-readable medium in which a computer program is stored that, when being executed by a computer, is configured to provide instructions to control or carry out the method of claim 7.

24. A computer program product embodied on a non-transitory computer-readable medium in which a computer program is stored that, when being executed by a computer, is configured to provide instructions to control or carry out the method of claim 18.

* * * * *